United States Patent [19]
Baker

[11] Patent Number: 5,121,068
[45] Date of Patent: Jun. 9, 1992

[54] SENSOR FOR SENSING THE WALL THICKNESS OF AN OBJECT

[75] Inventor: Russ J. Baker, Horseheads, N.Y.

[73] Assignee: Emhart Industries, Inc., Towson, Md.

[21] Appl. No.: 652,388

[22] Filed: Feb. 6, 1991

Related U.S. Application Data

[63] Continuation of Ser. No. 456,172, Dec. 26, 1989, abandoned.

[51] Int. Cl.⁵ .............................................. G01R 27/26
[52] U.S. Cl. .................................... 324/690; 324/671
[58] Field of Search .............. 324/671, 687, 690, 662, 324/686

[56] References Cited

U.S. PATENT DOCUMENTS

| | | |
|---|---|---|
| 2,754,478 | 7/1956 | Goldsmith .......................... 324/686 |
| 4,626,774 | 12/1986 | Regtien ............................... 324/683 |
| 4,751,842 | 6/1988 | Ekrann et al. ...................... 324/663 |
| 4,789,822 | 12/1988 | Ohmatoi ............................. 324/690 |
| 4,797,605 | 1/1989 | Palanisamy ......................... 324/687 |
| 4,804,905 | 2/1989 | Ding et al. .......................... 324/662 |
| 4,820,972 | 4/1989 | Scott et al. ...................... 324/158 P |

*Primary Examiner*—Kenneth A. Wieder
*Assistant Examiner*—Maura K. Regan
*Attorney, Agent, or Firm*—Spencer T. Smith

[57] ABSTRACT

A capacitive sensor senses the wall thickness of an object. The sensor has an electrode covered by an adhesive tape including a non-transparent glass cloth tape layer which engages the object and a layer of silicon or acrylic adhesive for securing the tape layer to the electrode. The adhesive and tape have a dielectric constant that is constant throughout the temperature range in which the sensor is to operate.

2 Claims, 1 Drawing Sheet

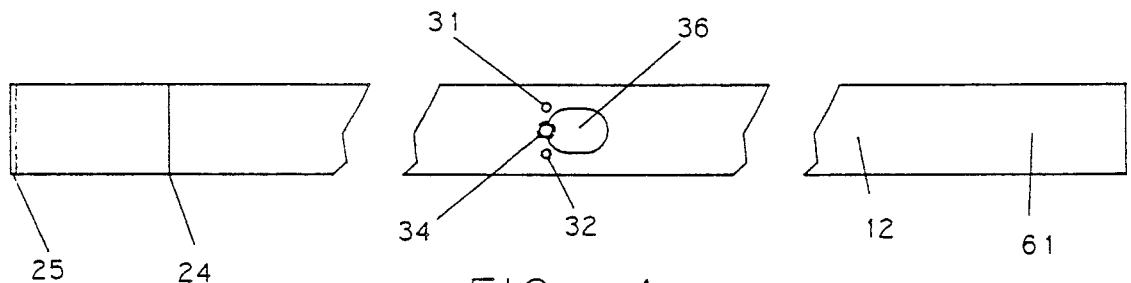
FIG. 1
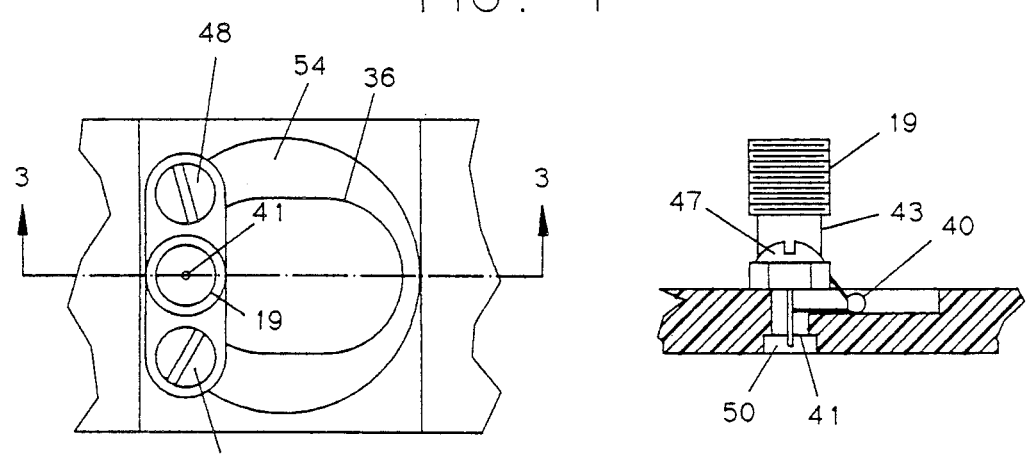
FIG. 2
FIG. 3
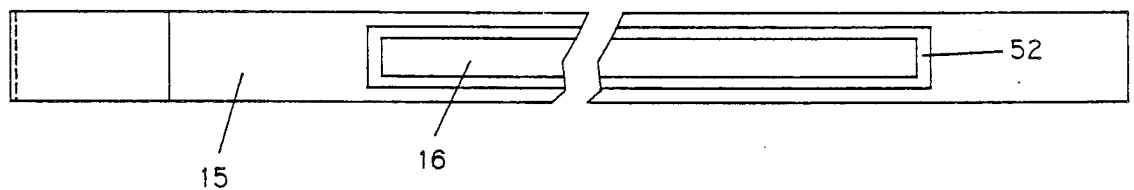
FIG. 4
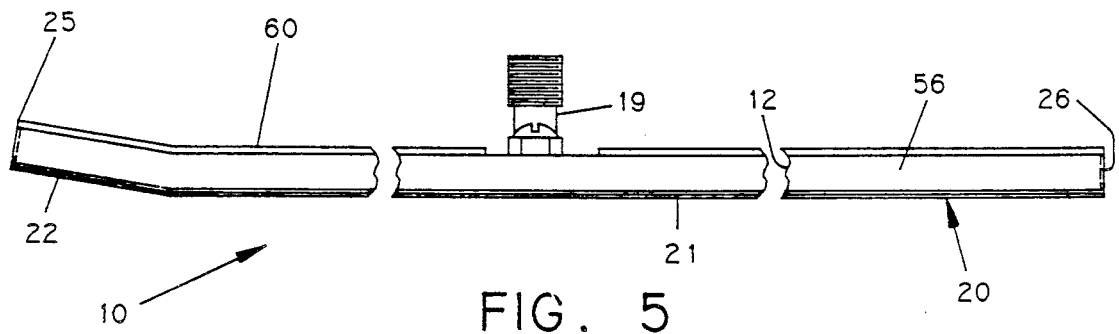
FIG. 5

SENSOR FOR SENSING THE WALL THICKNESS OF AN OBJECT

This is a continuation of co-pending application Ser. No. 07/456,172 filed on Dec. 26, 1989, now abandonned.

BACKGROUND OF THE INVENTION

1. Field of the Invention

The invention in general relates to the field of capacitive sensors for sensing the wall thickness of an object and more particularly relates to such a sensor that is useful in sensing the wall thickness of glass containers.

2. Description of the Prior Art

Capacitive sensors for sensing the wall thickness of objects such as glass bottles, flat glass and other products are well known. See for example U.S. Pat. No. 4,820,972 issued on an invention of Paul F. Scott et al and the various references cited therein. Such sensors generally include an electrode covered with protective layer of material which is non-abrasive and exhibits low wear in sliding contact with glass. The types of materials that are suitable for such tapes are limited because they must also provide an appropriate capacitance to permit the sensor to function. In the prior art, adhesive tapes made of ultra-high molecular weight polyethylene with a pressure sensitive rubber-based adhesive coating have provided such protective layers. Polyvinyl fluoride tapes with rubber-based adhesive coatings have also been suggested.

SUMMARY OF THE INVENTION

It is an object of the invention to provide a sensor for sensing the wall thickness of an object that overcomes one or more of the disadvantages of the prior art sensors.

It is another object of the invention to provide a sensor that provides the above object and provides suitable electrical properties at temperatures above 160° F.

The invention provides in a capacitive sensor for sensing the wall thickness of an object, the sensor being of the type having an electrode and a protective means covering the electrode for providing a suitable surface for contacting the object, the improvement wherein the protective means comprises a tape having an adhesive backing comprising a member of the group consisting essentially of silicon adhesive and acrylic adhesive. Preferably, the protective means comprises a glass cloth tape having an adhesive coating as described. Preferably, the adhesive is a silicon adhesive. Preferably, the protective means comprises 3M Brand tape part number 5453 PTFE glass cloth tape. Preferably, the glass cloth is 6 mils thick and the adhesive is 3 mils thick. Preferably, the adhesive and tape combined have a dielectric constant of 3.4–4.3.

The capacitive sensor according to the invention not only provides consistent properties over a wide temperature range but also provides excellent dielectric response for use with capacitive sensors and is highly resistant to wear. Numerous other advantages of the invention will become apparent when the following detailed specification is read in connection with the drawings.

BRIEF DESCRIPTION OF THE DRAWINGS

FIG. 1 shows a plane view of the back side of the electrode support strip;

FIG. 2 shows a back plane view of the electrical connector in position on the support strip;

FIG. 3 shows a partial cross-section taken through line 3—3 on FIG. 2;

FIG. 4 shows a partial front plane view of the strip of FIG. 1, with the electrodes painted on it;

FIG. 5 shows a side view of the complete sensor according to the invention.

DETAILED DESCRIPTION OF THE PREFERRED EMBODIMENT

Directing attention to FIG. 5, the preferred embodiment of a sensor 10 according to the invention is shown. It should be understood that this embodiment is intended to be exemplary only so as to illustrate the invention and is not intended to be limiting of the invention. The sensor shown is one used for sensing the wall thickness of a glass baby food jar. The sensor 10 according to the invention comprises a support strip 12, a pair of electrodes 15 and 16 (FIG. 4) attached to the support strip 12, an electrical connector 19 attached to the strip 12 and contacting the electrodes 15 and 16, and a protective means 20 covering the electrodes 15 and 16 and strip 12. The protective means 20 provides a suitable dielectric layer over the electrodes 15 and 16 to enable the sensor to be used in a conventional capacitive sensing circuit and also provides for non-abrasive, long wearing contact with the objects, such as glass containers, which slide against it while it is sensing their wall thickness.

Turning now to a more detailed description of the invention, the support strip 12 is shown in FIG. 1. The strip is shown broken in two places since in practice it is substantially longer than shown. The strip 12 is preferably made of polypropylene and is about 17.625 inches long by 0.625 inches wide by 0.250 inches thick. It is bent at a point 24 about 1.125 inches from one end 25 so that an inclined surface is provided to allow the jar to smoothly engage the sensor. Preferably the bend is such that end 25 is moved about 0.188 inches in the vertical direction in FIG. 5. Two 0.0667 inch holes 31 and 32 are drilled about 3/16 inches deep in the back surface (FIG. 1) about 0.148 inches in from each side and about 8.5 inches from end 25. Another hole 34 is drilled about 3/32 inches in diameter through the strip 12 between the two holes 31 and 32 with a ⅛ inch counterbore 50 1/16 inches deep about it in the front side. An oblong sink 36 is formed on the back side by two 0.312 inch diameter bores, one centered 8.656 inches from end 25 and the other centered 8.781 inches from end 25. The sink 36 is 0.125 inches deep. The strip 12 is painted with primer. A 12 picofarad capacitor 40 is soldered to the connector 19 between the inner conductor 41 and outer sheath 43 and the connector is screwed into strip 12 using two 2-56×¼ inch round head machine screws 47 and 48. Counterbore 50 is then filled with silver conductive epoxy to connect the center conductor 41 to strip 12. Strip 12 is then painted with silver conductive paint with an area 52 of primer left exposed to separate the two electrodes 15 and 16. Another area 54 of primer is also left exposed about sink 36. Strips of protective tape 20 are then placed over the electrode face and over ends 25 and 26 and the sides, such as 56 and a strip of Velcro ™ hook tape 60 0.065 inches thick by ⅜ inches wide with pressure sensitive adhesive backing is applied to back surface 61 of strip 12. Capacitor 40 is then covered with RTV silicon seal.

In the preferred embodiment, tape 20 is a tape with a dielectric constant of 3.4–4.3 having an adhesive backing 21 made of silicon adhesive. Preferably, the adhesive is 3 mils thick. Acrylic adhesive may also be use. Preferably, the fabric portion 22 of the tape is made of glass, specifically glass cloth. A suitable tape is 3M TM Brand No. 5453 PTFE glass cloth tape. Another suitable tape is 3M TM Brand tape product No. 5425 ultra-high molecular weight polyethylene tape with acrylic adhesive backing. Several layers of this tape would be preferable.

It has been found that the sensor according to the invention works well at temperatures over 160° F., and is useable up to about 500° F., which is well over any temperature likely to be developed at the glass/sensor interface. It is also very durable.

There has been described a novel capacitive sensor which is useful at high temperatures and has many other advantages. It is evident that those skilled in the art may now make numerous uses and modifications of the embodiments described without departing from the inventive concepts. For example, other tapes made by other manufacturers may be used. Or many different sizes and shapes of sensors may be used. Consequently, the invention should be considered to include any novel elements or novel combination of elements included in the sensor described.

What is claimed is:

1. A capacitive sensor for sensing the wall thickness of an object, said sensor having an electrode and protective means covering said electrode for providing a suitable surface for contacting the object, said protective means comprising an adhesive tape including a non transparent glass cloth tape layer for engaging the object and a layer of silicon or acrylic adhesive for securing said tape layer to said electrode, said adhesive layer and said tape layer having a dielectric constant that is constant throughout the temperature range in which said capacitive sensor is to operate.

2. A capacitive sensor accordingly to claim 1, wherein said adhesive tape is 3M Brand tape part number 5453 PTFE non transparent glass cloth tape.

* * * * *